E. E. HAWLEY.
Hand-Plow.
No. 5,956. Patented Dec. 5, 1848.
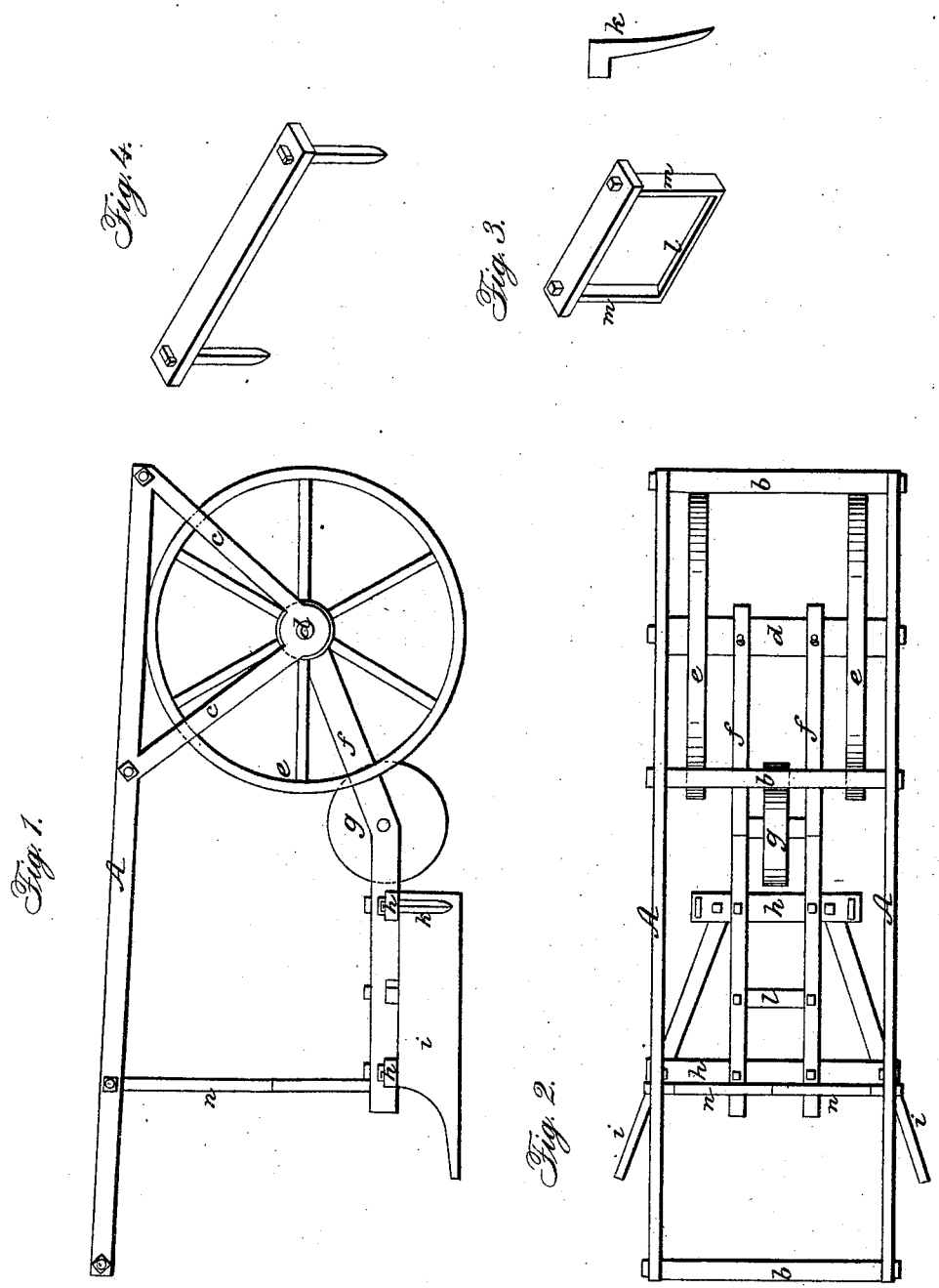

UNITED STATES PATENT OFFICE.

E. E. HAWLEY, OF MIDDLETOWN, CONNECTICUT.

IMPROVEMENT IN HAND-CULTIVATORS.

Specification forming part of Letters Patent No. 5,956, dated December 5, 1848.

*To all whom it may concern:*

Be it known that I, E. E. HAWLEY, of Middletown, in the county of Middlesex and State of Connecticut, have invented certain new and useful Improvements in Cultivators or Tillers for Land; and I do hereby declare that the following is a full, clear, and exact description of the principle or character which distinguishes them from all other things before known, and of the usual manner of making, modifying, and using the same, reference being had to the accompanying drawings, which form a part of the same.

Figure 1 is a side elevation; Fig. 2, top plan; Fig. 3, detached parts; Fig. 4, bar with teeth.

The nature of my invention consists in constructing and arranging a wheel-cultivator to be used by hand to serve all the purposes of hand-hoeing.

The construction is as follows: The frame by which the implement is propelled is formed of two side rails, A, with connecting-bars $b$ to unite them. From the under side of the front ends of these bars diagonal braces $c$ project, the lower ends of which are united and receive the journals or bearings of an axle, $d$, to which a pair of wheels, $e$, are affixed. To the axle $d$, above named, two side rails, $f$, are connected, that incline downward at an angle of about twenty-five degrees behind the axle till they reach the level of the top of the cultivator-frame, a part of which they then become by thence running back horizontally to the rear end of said frame. To these rails are affixed cross-bars $h$, at right angles thereto, of a suitable length for the purposes intended, and at the angle or junction of the inclined and horizontal part of said rails there is a small wheel or roller, $g$, to regulate the depth to which the cultivator shall go.

To the bars may be attached scrapers or shares $i$ for throwing up the earth against the plants in the rows on each side; or the bars may be armed with teeth $k$, as shown in the detached bar, Fig. 4. These teeth are made lancet-shaped, and could, if desired, be drawn either way. They are placed in the bars in harrow form, those behind being in the spaces between those in the front bar. When the teeth are used the shares are dispensed with, and vice versa. In using the shares I also introduce what I denominate a "skim," which is a horizontal scraper, $l$, connected with the bars by two standards, $m$. The scraper is knife-shaped and skims the surface in the furrow between the rows, thereby eradicating all the weeds in its progress. The length of the shares, number of the teeth, or size of the skim may be varied, while the same principle is retained to suit the various stages of cultivation and character of the crop and the soil on which it is used. I affix to the rear end of the side rails a pair of cross-braces, $n$, that extend down to the frames of the tiller, that steady and guide it, and also serve to rest the handle upon. This is essential to the well working of the machine in use. The tiller thus constructed is impelled forward by the power of a man, who guides and pushes it by the handles as he walks along with the tiller in front of him, and serves all the purposes of the hand-hoe, doing a much greater amount of work in the same time and with less labor. The weight of the frame in all common soils is sufficient to force the cutting parts into the soil to the depth that the gage-wheel will admit; but if it is found insufficient for that purpose a few pounds weight added to the rear part of the frame will correct the difficulty.

Having thus fully described my improvement, what I claim as new, and for which I desire to secure Letters Patent, is—

The tiller constructed substantially as herein described, consisting of a frame containing the tilling implements, in combination with the wheels and axle, propelling-handle, and guiding-brace, the whole being constructed and arranged as herein fully set forth.

E. E. HAWLEY.

Witnesses:
 CURTISS BACON,
 JOHATHAN BARNES.